THIN FILM PIEZOELECTRIC TRANSDUCER
Filed Nov. 22, 1967
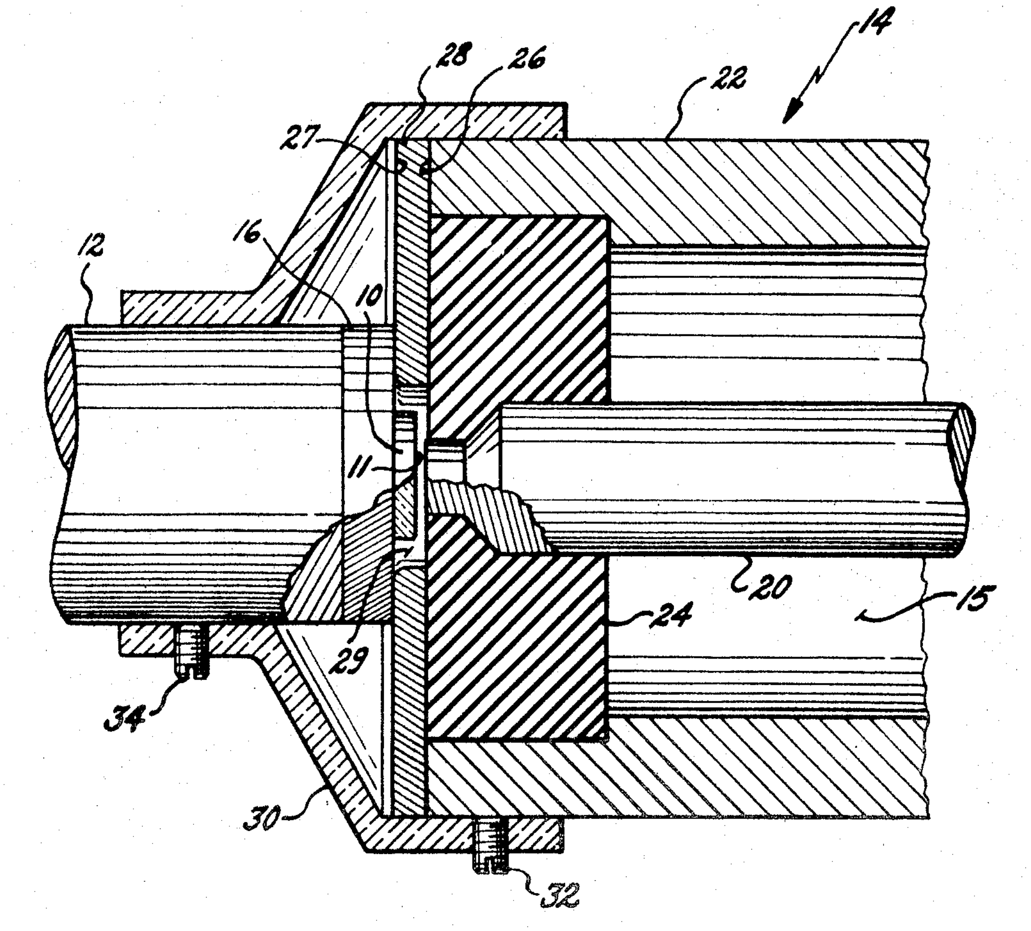
INVENTORS
DONALD K. WINSLOW
HERBERT J. SHAW
CALVIN F. QUATE
BY Harry A. Herbert Jr
Jacob N. Erlich and
ATTORNEYS United States Patent Office 3,465,177

Patented Sept. 2, 1969

3,465,177

THIN FILM PIEZOELECTRIC TRANSDUCER

Donald K. Winslow, Palo Alto, Herbert J. Shaw, Stanford, and Calvin F. Quate, Los Altos Hills, Calif., assignors to the United States of America as represented by the Secretary of the Air Force Filed Nov. 22, 1967, Ser. No. 685,209
Int. Cl. H01v *7/00*
U.S. Cl. 310—8 3 Claims

ABSTRACT OF THE DISCLOSURE

A piezoelectric thin film transducer evaporated on a first film which has been deposited on the face of an optically polished rod, the diameter of the piezoelectric thin film transducer being smaller than the diameter of the first film. A second film is juxtapositioned to the first film and deposited upon an optically polished surface of a coaxial line having a conductor in the center thereof, the second film being thicker than the piezoelectric thin film transducer and having a hole in the center thereof greater in diameter than the diameter of the piezoelectric thin film transducer.

This invention relates generally to thin film transducers, and more particularly the combination of the piezoelectric thin film transducer mounted on an acoustic delay line and coupled to a coaxial line for the purposes of evaluating the thin film transducer or for use in other circuitry.

A very important approach to the realization of variable time delay and phase shift at microwave frequencies is through the use of microwave acoustic waves in solids. In all such devices and applications of acoustic waves, one of the largest practical difficulties has been in the coupling or conversion loss in transducers designed to couple microwave electromagnetic energy into microwave acoustic waves.

In accordance with this invention, facilities have been set up for the fabrication of new types of transducers, particularly employing thin film techniques. Furthermore, working models of new approaches to transducer design have been fabricated and tested in the laboratory by measurements of coupling or conversion loss and passband characteristics. Through the above methods, it has been found that the proper use of thin films leads to transducers of very low conversion or coupling loss.

In order to measure the conversion or coupling loss of these thin film transducers, it becomes necessary to deposit suitable thin piezoelectric films such as cadmium sulfide or zinc oxide on a transmission rod delay line and to generate acoustic waves in these transmission rod delay lines. The measurements are then made with a coaxial line mount which is tuned at various frequencies.

It is an object of this invention to provide a piezoelectric thin film transducer mounted on an acoustic delay line and coupled to a coaxial line which satisfies dimensional tolerances and stability.

It is still a further object of this invention to provide a mounted piezoelectric thin film transducer for use in evaluating the film as a transducer.

It is still a further object of this invention to provide a piezoelectric thin film transducer mounted on an acoustic delay line which is economical to produce and which utilizes conventional, currently available components that lend themselves to standard mass production manufacturing techniques.

For a better understanding of the present invention, together with other and further objects thereof, reference is had to the following description taken in connection with the accompanying drawing and its scope will be pointed out in the appended claims.

The accompanying drawing represents an enlarged fragmentary cross-sectional view of this invention showing the piezoelectric thin film transducer on a coaxial mount.

Referring to the drawing, there is shown a piezoelectric thin film transducer 10 mounted upon a rod or acoustic delay line 12 which is coupled to coaxial line 14. Acoustic waves are propagated into delay line 12 and the electromagnetic microwave fields are in the region indicated at 15. It is necessary to produce concentrated electrical fields normal to the face of the piezoelectric thin film transducer 10.

According to the instant invention, a suitable piezoelectric thin film 10 such as cadmium sulfide or zinc oxide is evaporated in any conventional manner over one or more layers of previously deposited suitable films 16 (of which only one film is shown in the drawing). The film 16 is preferably of metal, such as gold, and is preferably evaporated on a rod or delay line 12 which has been polished flat to optical tolerances. The center conductor 20 of coaxial line 14 is held in position with respect to outer conductor 22 by a suitable low loss dielectric material 24 such as quartz. The face 26 of the coaxial line 14, which includes the end portion of inner conductor 20, outer conductor 22 and dielectric 24, is optically polished. A suitable metal film 28 such as gold is deposited on the face 26 by conventional evaporation techniques with no deposited metal film near the center conductor 20. The hole 29 is the center of the metal film 28 is larger in diameter than the diameter of the thin piezoelectric film 10, but is less than the diameter of the metal film 16, so that there is generally a metal film contact between films 16 and 28. The film thicknesses are controlled by a suitable, conventional film monitor (not shown) such that the film surface 11 of the thin piezoelectric film 10 is free; in other words, the piezoelectric film surface 11 does not contact the center conductor 20. This is achieved by making the film 28 thicker than the piezoelectric film 10. The rod or acoustic delay line 12 with accompanying films 16 and 10 thereon is positioned firmly against the top surface 27 of film 28 and held in place by any suitable fastening means such as holder 30 and set screws 32 and 34. This method of mounting achieves a rigid, fixed mount in the region of strong E fields and locates the center conductor 20 separate from the active thin film surface 11 of film 10 by a small preselected air gap. The size of this air gap is controlled by controlling the thickness of film 28 and thin piezoelectric film 10 and, for optimum results, is of the order of one mircron or less. The above type mounting provides the necessary stability in the electromagnetic acoustic coupling for the many applications in acoustic wave devices at microwave frequencies.

In mounting the piezoelectric thin film transducer, the following method is performed. One or more layers of thin film 16, preferably metal, are evaporated by a suitable evaporation process, on a rod or delay line 12 which has been polished flat to optical tolerances. Next, a piezoelectric thin film 10 is evaporated by a suitable evaporation process over the central portion of the last layer of film 16. It is important that the diameter of the film 10 be less than the diameter of the film 16.

A suitable thin metal film 28 is now evaporated on the face 26 of a coaxial line 14 having an outer conductor 22 and a center conductor 20 held in place by a dielectric material 24. The film 28 is evaporated on the face 26 of coaxial line 14 in such a manner as to have a hole 29 in the center thereof. The diameter of the hole 29 is made larger than the diameter of thin piezoelectric film 10, but less than the diameter of film 16. The thicknesses of films 10 and 28 are controlled by a suitable film monitor so that the thickness of film 28 is greater than the thickness of film 10.

The rod or delay line 12 with films 16 and 10 thereon is now mounted on coaxial line 14 so that the film surface 11 of thin piezoelectric film 10 is free. In other words, there is a preselected air gap of approximately one micron between thin piezoelectric film 10 and film 28. The rod or delay line 12 and coaxial line 14 are held together by any suitable fastening means such as holder 30.

Although the invention has been described with reference to a particular embodiment, it will be understood to those skilled in the art that the invention is capable of a variety of alternative embodiments within the spirit and scope of the appended claims.

We claim:

1. The combination of a first film, a piezoelectric thin film transducer mounted on the central portion of said first film and having a diameter less than the diameter of said first film, a second film juxtapositioned to said first film and centered on a dielectric material having a conductor in the center thereof, said second film having a hole in the center thereof larger in diameter than the diameter of said piezoelectric thin film transducer but less than the diameter of said first film, the thickness of said second film being greater than the thickness of said piezoelectric thin film transducer, and said first film, with said piezoelectric thin film transducer thereon, being positioned against the surface of said second film such that said piezoelectric thin film transducer is located within the hole of said second film thereby establishing an air gap between said piezoelectric thin film transducer and said conductor.

2. The combination as defined in claim 1, wherein said first and second films are metal.

3. The combination as defined in claim 2, wherein the size of the air gap between said piezoelectric thin film transducer and said conductor is approximately one micron.

References Cited

UNITED STATES PATENTS

| | | | |
|---|---|---|---|
| 3,351,786 | 11/1967 | Muller et al. | 310—8 |
| 3,215,133 | 11/1965 | Farrell | 310—8.3 X |
| 3,230,774 | 1/1966 | Ostrow | 310—8.7 X |
| 2,861,247 | 11/1958 | McSkimin | 333—30 |
| 3,034,001 | 5/1962 | King | 310—8.7 |
| 2,624,852 | 1/1953 | Forbes et al. | 333—30 X |
| 2,700,738 | 1/1955 | Havens | 310—8.3 |

MILTON O. HIRSHFIELD, Primary Examiner

MARK O. BUDD, Assistant Examiner

U.S. Cl. X.R.

310—8.3, 9.1; 317—234; 333—30